United States Patent [19]

Shibata et al.

[11] Patent Number: 5,587,907
[45] Date of Patent: Dec. 24, 1996

[54] VEHICLE SUSPENSION APPARATUS CAPABLE OF PREVENTING GENERATION OF TRANSITIONAL VARIATION IN ROLLING MOVEMENT

[75] Inventors: Mineharu Shibata, Ohtake; Shin Takehara, Higashihiroshima, both of Japan

[73] Assignees: Naldec Corporation; Mazda Motor Corporation, both of Hiroshima, Japan

[21] Appl. No.: 497,702

[22] Filed: Jun. 30, 1995

Related U.S. Application Data

[63] Continuation of Ser. No. 90,255, Jul. 13, 1993, abandoned.

[30] Foreign Application Priority Data

Jul. 14, 1992 [JP] Japan ................................. 4-186605

[51] Int. Cl.$^6$ ................................................ B60G 17/015
[52] U.S. Cl. .................................. 364/424.046; 280/707
[58] Field of Search ........................ 364/424.01, 424.05, 364/426.01; 280/707

[56] References Cited

U.S. PATENT DOCUMENTS

| | | | |
|---|---|---|---|
| 5,088,761 | 2/1992 | Takehara et al. | 364/424.05 |
| 5,142,476 | 8/1992 | Shibata et al. | 364/424.05 |
| 5,154,443 | 10/1992 | Takehara et al. | 280/707 |
| 5,176,399 | 1/1993 | Takehara et al. | 280/707 |
| 5,218,545 | 6/1993 | Takehara | 364/424.05 |
| 5,251,134 | 10/1993 | Takehara et al. | 364/424.05 |

FOREIGN PATENT DOCUMENTS

| | | |
|---|---|---|
| 4024305 | 3/1991 | Germany . |
| 4039629 | 6/1992 | Germany . |
| 3-182826 | 8/1991 | Japan . |

OTHER PUBLICATIONS

Office Action issued on Oct. 18, 1994 from German Patent Office (translation of Office Action only).

*Primary Examiner*—Kevin J. Teska
*Assistant Examiner*—Tyrone V. Walker

[57] ABSTRACT

A suspension apparatus for vehicles capable of changing a characteristic of suspension by controlling supply/release of fluid into/from hydraulic cylinders which are respectively provided between a vehicle body and each wheel. The apparatus detects vehicle height signals at a plurality of positions and extracts at least a bouncing component signal and a rolling component signal from vehicle-height signals detected by the plurality of vehicle-height sensors. Each of the bouncing component signal and rolling component signals are filtered and are used to control supply/release of fluid into/from hydraulic cylinders based on the filtered signals. A cut-off frequency for the rolling component signal set in said filtering unit is set higher than that for the bouncing component signal.

10 Claims, 13 Drawing Sheets

HEIGHT CONTROL

CUT-OFF FREQUENCY
BOUNCING ($X_{H1}$)
PITCHING ($X_{H2}$)

ROLLING ($X_{H3}$, $X_{H4}$)

BOUNCING ($X_{G1}$)
PITCHING ($X_{G2}$)

ROLLING ($X_{G3}$, $X_{G4}$)

SPRUNG WEIGHT DISPLACEMENT

COMFORTABILITY

VEHICLE SUSPENSION APPARATUS CAPABLE OF PREVENTING GENERATION OF TRANSITIONAL VARIATION IN ROLLING MOVEMENT

This application is a continuation of application Ser. No. 08/090,255, filed Jul. 13, 1993, now abandoned.

BACKGROUND OF THE INVENTION

1. Field of the Invention

The present invention relates to a suspension apparatus for vehicles capable of changing the characteristics of suspension by controlling the supply and release amounts of hydraulic flow to hydraulic cylinders.

2. Description of the Related Art

A conventional suspension apparatus, an active control suspension apparatus (ACS apparatus) is well known as disclosed in Japanese Kokai No. Hei 3-182826. This ACS apparatus is provided with a hydraulic cylinder between a vehicle body and each wheel, and changes the characteristics of the suspension in accordance with a driving state by independently controlling the fluid flow amount to each hydraulic cylinder with a flow control valve.

In the conventional technique, a vehicle-height signal and vertical acceleration signal are collected on each wheel. The collected signals are passed through a low-pass filter, to extract a bouncing component, pitching component, and rolling component of vehicle movement from the low-pass components, and flow control signals are calculated for the hydraulic cylinders to suppress a movement of the vehicle body on each of bouncing mode, pitching mode, and rolling mode.

The low-pass filter is used in the conventional technique, because if the gain of a relatively high frequency component is not decreased, the control of changing the suspension characteristic is excessively applied to the movement of the vehicle body having a relatively high frequency, resulting in a resonance.

Comfortableness depends on the bouncing mode and pitching mode, and controllability and stability are influenced by the movement on the rolling mode. Accordingly, the suspension control to suppress the rolling movement should have a characteristic which is different from the control to suppress the bouncing movement or the pitching movement.

However, in the above-described conventional technique, an overall height signal (or a vertical G signal) is subjected to the low-pass filter. Therefore, the gain for the rolling component can not be independently changed. Accordingly, a transitional rolling movement of the vehicle body can not be prevented, resulting in a decrease on the controllability and stability.

SUMMARY OF THE INVENTION

Accordingly, in light of the above problem, it is an object of the present invention to provide a suspension apparatus for vehicle capable of preventing a generation of transitional variation in rolling movement.

The above object is attained by providing a suspension apparatus for vehicles capable of changing a characteristic of suspension by controlling supply/release of fluid into/ from hydraulic cylinders which are respectively provided between a vehicle body and each wheel, comprising:

a plurality of vehicle-height sensors for detecting vehicle height signals at a plurality of positions;

extraction means for extracting at least a bouncing component signal and rolling component signal from vehicle-height signals detected by the plurality of vehicle-height sensors;

filtering means for filtering each of the bouncing component signal and rolling component signal; and control means for controlling supply/release of fluid into/ from hydraulic cylinders based on the output signals from said filtering means, wherein a cut-off frequency for the rolling component signal set in said filtering means is set higher than that for the bouncing component signal.

The invention is easily understood by referencing FIG. 1. Since a relatively high frequency range of the bouncing component, rolling component of the vehicle movement are cut by filtering means having predetermined cut-off frequencies, an oscillation of the vehicle movement at the high frequency range is suppressed. Furthermore, since the cut-off frequency of the rolling component is set higher than that of the bouncing component, a control gain to suppress the vehicle movement of the rolling component is set relatively high in comparison with the bouncing component. Accordingly, generation of a transitional rolling movement which effects controllability and stability is prevented.

According to one aspect of the present invention, the suspension apparatus is provided with a control for the pitching movement. That is, the cut-off frequency of the rolling component is higher than that of the pitching component.

According to another aspect of the present invention, the cut-off frequencies of the bouncing component, pitching component, and rolling component are determined in this sequence.

According to another aspect of the present invention, a vehicle movement in vertical acceleration is also controlled.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings.

Figure 1:
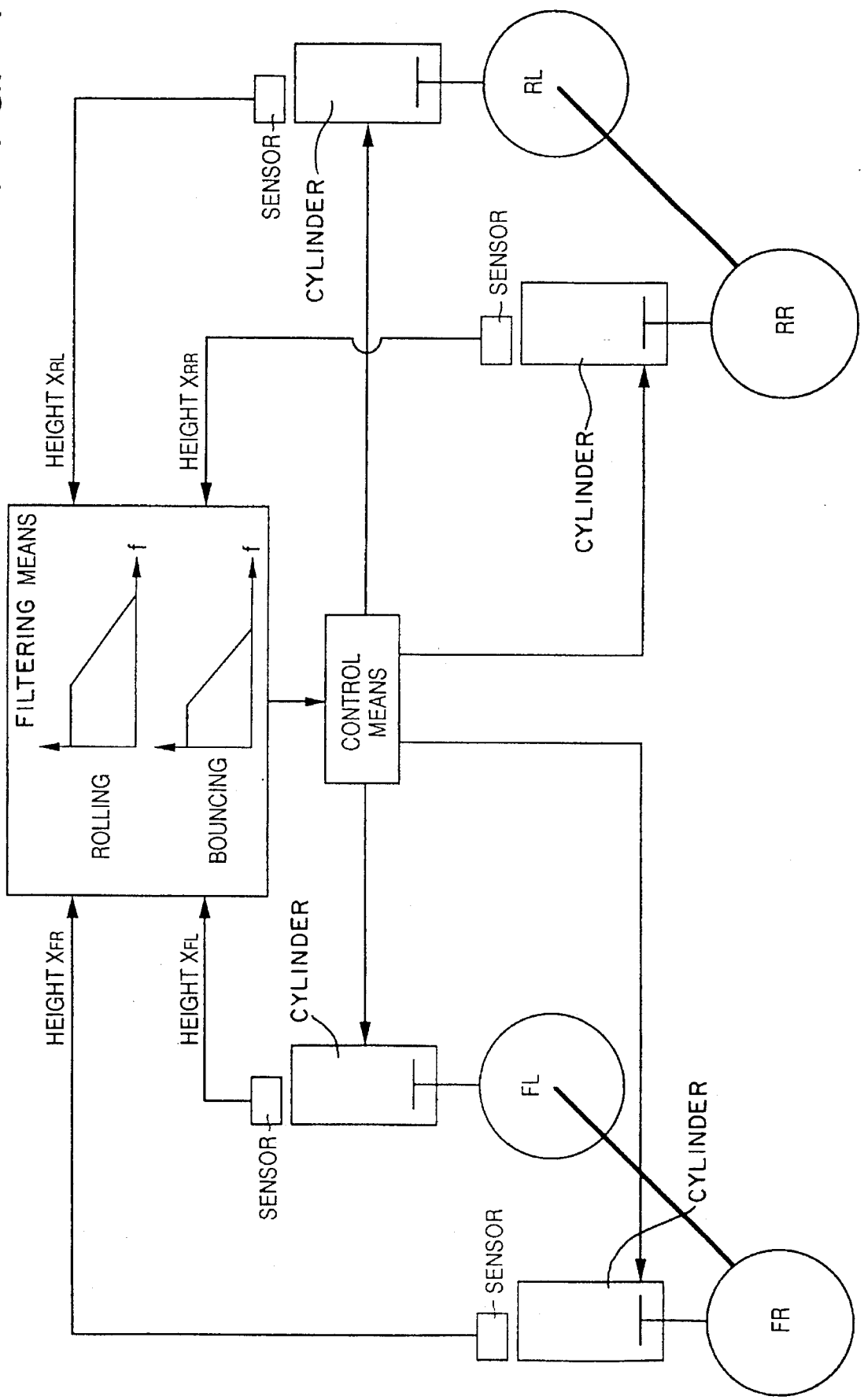
FIG. 1 is a block diagram illustrating the construction of the present invention.
Figure 2:
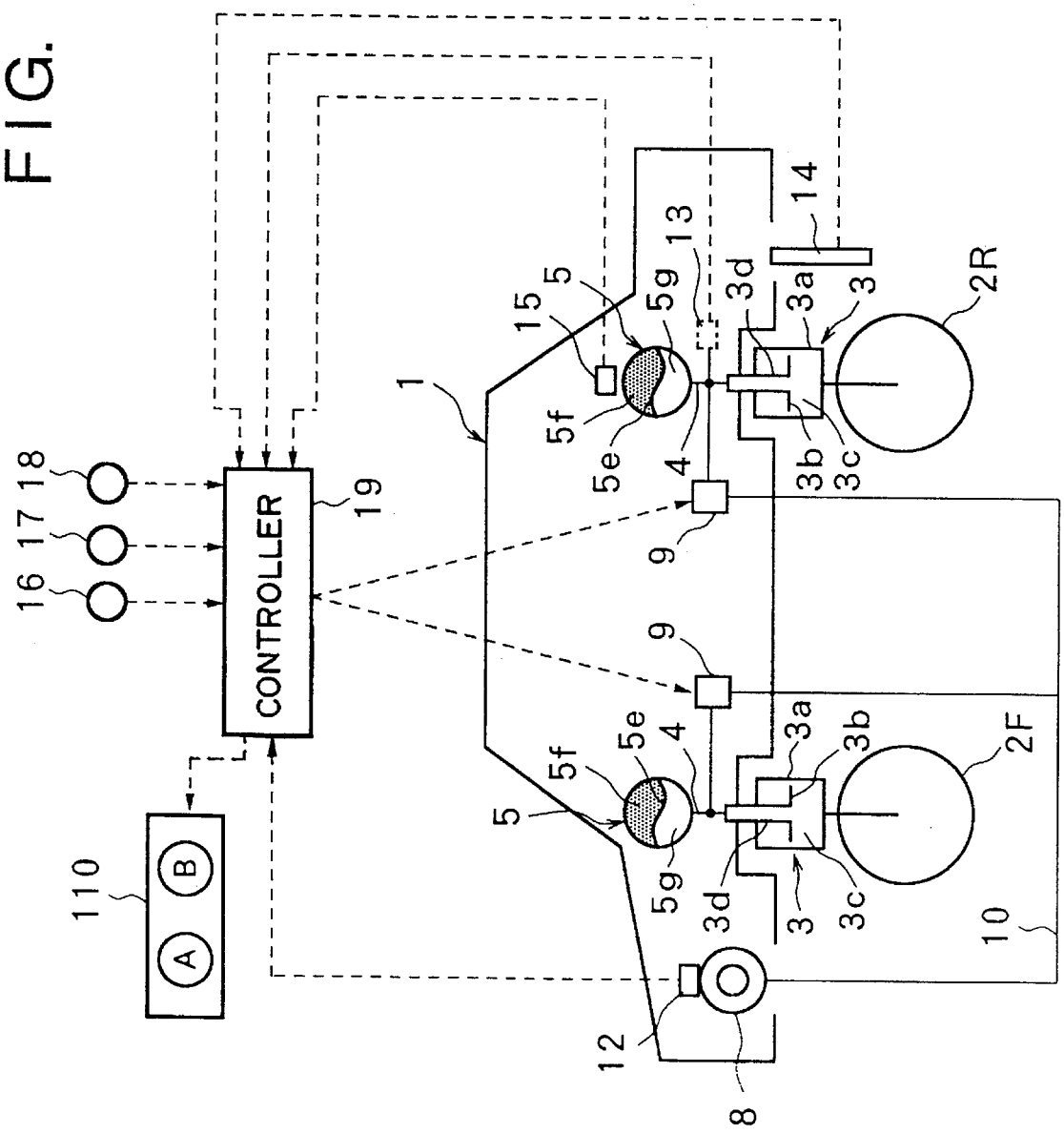
FIG. 2 is a block diagram illustrating a suspension apparatus according to a preferred embodiment of the present invention.
Figure 3:
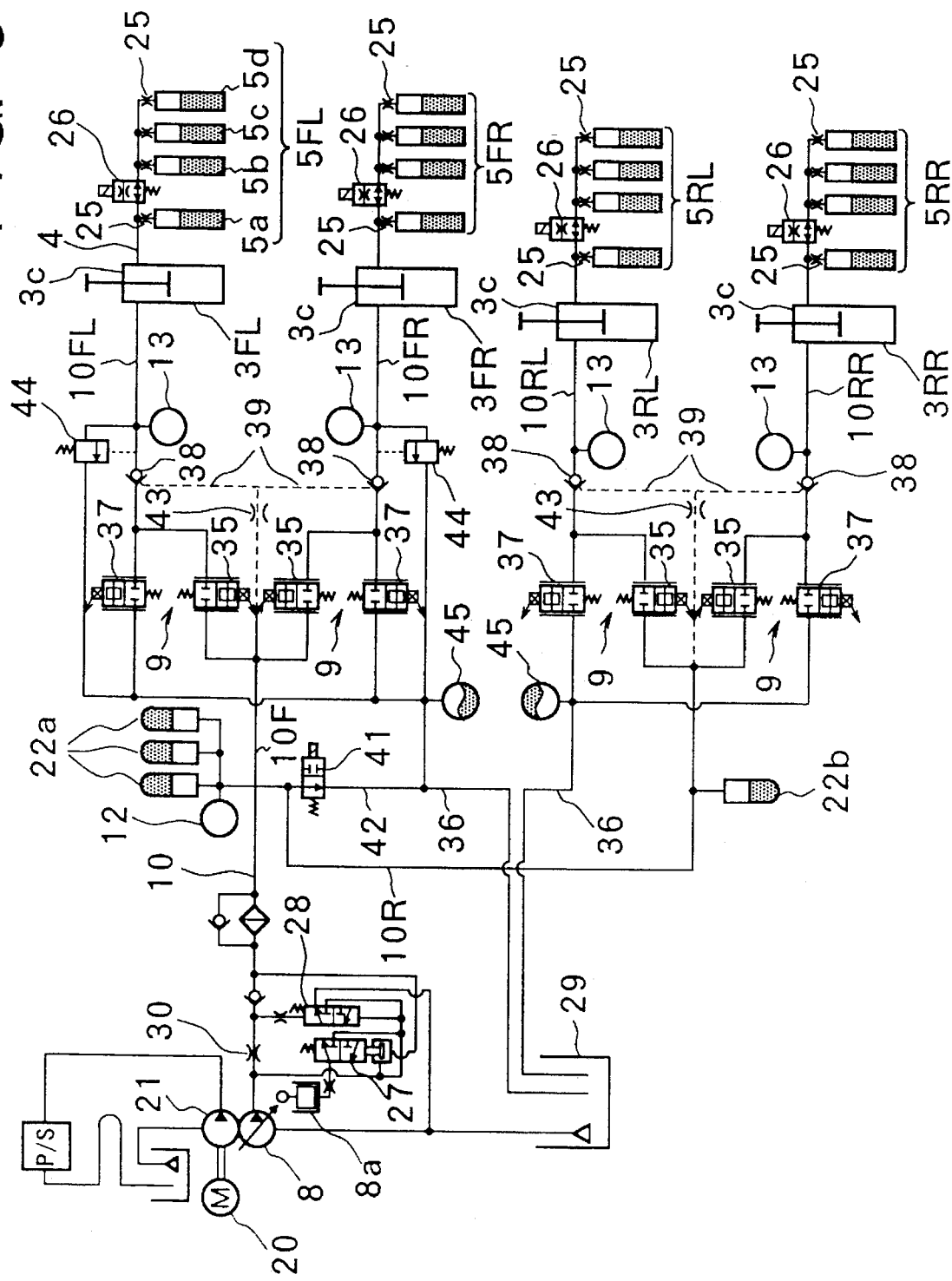
FIG. 3 is a diagram illustrating a hydraulic system of the embodiment of FIG. 2.

FIG. 2 is a diagram illustrating a suspension apparatus according to the preferred embodiment, FIG. 3 is a diagram illustrating a hydraulic circuit of the suspension apparatus of FIG. 2, and FIGS. 4–6 are block diagrams illustrating a control method of the suspension apparatus of FIG. 2.

The features of the embodiment are as follows:

I. In order to improve the comfortability, signals from the height sensors are passed through the low pass filter which passes extremely low frequency. In this way, oscillation of the control occurring along the vehicle movement of high frequency is suppressed.

II. In light of the fact that the rolling control effects the controllability and stability, the cut-off frequency of the rolling component signal is set higher than those of the bouncing component signal and pitching component signal. Thus, responsiveness of the rolling control is improved. Accordingly, generation of transitional rolling movement is prevented.

The construction of the suspension apparatus of the embodiment is described referring to FIG. 2.

In FIG. 2, numeral 1 is a vehicle body, numeral $2_F$ are the front wheels, numeral $2_R$ are the rear wheels, hydraulic cylinders 3 are respectively provided between the body 1 and front wheels $2_F$ and rear wheels $2_R$.

Each hydraulic cylinder 3 includes a hydraulic chamber $3c$ formed into division by a piston $3b$ which is inserted into cylinder body $3a$. A top end of the rod $3d$ which connects to each piston $3b$ is connected to the body 1 and the cylinder bodies $3a$ are respectively connected to the front and rear wheels $2_F$, $2_R$.

The hydraulic chamber $3c$ of the hydraulic cylinder 3 is connected to a pneumatic spring 5 via a connecting path 4. The pneumatic spring 5 includes a pneumatic chamber $5f$ and hydraulic chamber $5g$ formed by a diaphragm $5e$. The hydraulic chamber $5g$ connects to the hydraulic chamber $3c$ of the hydraulic cylinder 3.

Numeral 8 is a hydraulic pump, numeral 9 is a flow control valve which is provided on a hydraulic path 10 connecting to the hydraulic pump 8 and each hydraulic cylinder 3 by a high pressure oil line. The flow control valve 9 functions to adjust the flow rate by supply and release of fluid (oil) to/from the hydraulic cylinder 3.

Furthermore, numeral 12 is a main pressure sensor which detects an oil discharging pressure (a main pressure) of the hydraulic pump 8 and an accumulated pressure within accumulators $22a$ and $22b$ (which are described later). Numeral 13 is a cylinder pressure sensor which detects a hydraulic pressure P of the hydraulic chamber $3c$ of each hydraulic cylinder 3. Numeral 14 are vehicle-height sensors which detect vehicle heights X(s) (that is, amount of cylinder stroke) of the corresponding wheels $2_F$, $2_R$. Numeral 15 is a vertical acceleration sensor which detects a vertical acceleration (spring acceleration of mass-over the wheels $2_F$, $2_R$) and numeral 16 is a lateral acceleration sensor which detects a lateral acceleration $Y_G$. Numeral 17 is a steering angle sensor which detects a steering angle of the front wheels $2_F$, and numeral 18 is a vehicle speed sensor which detects vehicle speed. The detection signals detected by these sensors 12–18 are inputted into a controller 19 containing a CPU and used for variably controlling the characteristics of the suspension.

Numeral 110 is a warning display which is installed in an instrument panel (not shown) viewed at the front sheet. The warning display 110 receives an instruction to light up a lamp from the controller 19, and has two warning lamps. A warning lamp A is lit when a unit of the flow control system has failed, while a warning lamp B is lit when the control of supply and release of flow is suspended by closing a check valve described later.

FIG. 3 is a diagram illustrating a hydraulic circuit which controls supply/release of fluid with respect to the hydraulic cylinder 3. In FIG. 3, the hydraulic pump 8 is comprised of a variable-displacement-type piston pump and is a twin pump with a hydraulic pump 21 for power steering apparatus driven by a driving source 20. Accumulators $22a$ are connected to a passage 10 connecting to the hydraulic pump 8, and the passage 10 is branched into a front-wheel passage $10_F$ and rear-wheel passage $10_R$. The front-wheel passage $10_F$ is further branched into a left-front-wheel passage $10_{FL}$ and right-front-wheel passage $10_{FR}$. Each of the passages $10_{FL}$ and $10_{FR}$ are respectively connected to the hydraulic chambers $3c$ of the hydraulic cylinders $3_{FL}$ and $3_{FR}$ of each wheel. The rear-wheel passage $10_R$ is connected to one of the accumulators $22b$ and is branched into a left-rear-wheel passage $10_{RL}$ and right-rear-wheel passage $10_{RR}$ at the down-stream side. Each of the passages $10_{RL}$ and $10_{RR}$ are respectively connected to the hydraulic chambers $3c$ of the hydraulic cylinders $3_{RL}$ and $3_{RR}$ of each wheel.

Pneumatic spring units $5_{FL}$, $5_{FR}$, $5_{RL}$, $5_{RR}$ which are respectively connected to the hydraulic cylinders $3_{FL}$, $3_{FR}$, $3_{RL}$, $3_{RR}$, each of which consist of a plurality of springs, for example, four pneumatic springs 5a, 5b, 5c, 5d in the figure. These pneumatic springs 5a, 5b, 5c, 5d are connected to the hydraulic chamber 3c of the hydraulic cylinders 3 via a connecting passage 4 in parallel. The pneumatic springs 5a, 5b, 5c, 5d are respectively provided with an orifice 25 at the branching point of the connecting passage 4, and serve for damping effect and buffer effect. A dumping-force switch valve 26 which adjusts an area of passage cutaway is provided between the first pneumatic spring 5a and second pneumatic spring 5b in the connecting passage 4, and has two states such as an open state and a closed state which considerably restricts the area of passage cutaway.

The passage 10 is connected to an unload valve 27 and flow control valve 28 at the upper-stream side of the accumulator 22a. The unload valve 27 has an introducing and discharging states. The introducing state is for introducing pressurized oil discharged from the hydraulic pump 8 into a cylinder 8a and reducing a discharging amount of the hydraulic pump 8. The discharge state is for discharging the oil pressure in the cylinder 8a. The unload valve 27 is arranged so as to switch from the discharge state to the introducing state when the discharge pressure of the hydraulic pump 8 reaches a predetermined maximum pressure (approximately 160 kgf/cm$^2$) and retains this state when the pressure is lower than a predetermined minimum pressure (approximately 120 kgf/cm$^2$). The unload valve 27 functions as a pressure adjusting valve which retains and controls an oil pressure of the hydraulic pump 8 within the predetermined range (120–160 kgf/cm$^2$). The flow control valve 28 also has an introducing state and discharge state. The introducing state is for introducing the oil pressure from the hydraulic pump 8 to the cylinder 8a via the unload valve 27 and the discharge state is for discharging the oil pressure of the cylinder 8a to a reservoir 29. The flow control valve 28 has a function to maintain and control the oil discharge amount of the hydraulic pump 8 to be constant by maintaining the pressure difference between the upper stream and down stream of the orifice 30 of the passage 10.

However, oil is supplied to each hydraulic cylinder 3 by accumulated pressure of the accumulators 22a and 22b. The accumulated pressure of the accumulators 22a and 22b is substantially the same as the pressure at the down-stream side of the accumulator of the passage 10 which is the main passage and this is referred to as "main pressure".

On the other hand, the four flow control valves 9 corresponding to each wheel are provided at the down-steam side of the accumulators 22a. Only the construction of the flow control valve 9 of the left-front-wheel side is described since the construction of the corresponding portion of each wheel is the same as that of the flow control valve 9 of the left-front-wheel side. The flow control valve 9 is comprised of an inflow valve 35 and exhaust valve 37. The inflow valve 35 has two states: Closed state and supplying state capable of changing the degree of openness (open state). The inflow valve 35 is provided in the left-front wheel passage $10_{FL}$ of the passage 10 and the pressurized fluid (oil) accumulated in the accumulator 22a is supplied to the hydraulic cylinder $3_{FL}$ by opening by fine adjustment. Furthermore, the exhaust valve 37 has two states: Close state and releasing or draining state (open state) capable of changing the openness. The exhaust valve 37 is provided in the passage 36 which connects the reservoir 29 to the left-front wheel passage $10_{FL}$, and the fluid supplied to the hydraulic cylinder $3_{FL}$ is exhausted to the reservoir 29 by a fine adjustment. The inflow valve 35 and exhaust valve 37 are spool type valves and respectively contain a differential pressure regulating valve which maintains the hydraulic pressure to a predetermined value at the open state.

A check valve 38 which is responsive to pilot pressure is provided as a poppet isolation valve in the left-front wheel passage $10_{FL}$ between the inflow valve 35 and hydraulic cylinder $3_{FL}$. The check valve 38 is arranged such that the hydraulic pressure (that is, the main pressure or accumulated force in the accumulators 22a, 22b) in the passage 10 at the upper-stream side of the inflow valve 35 is introduced as a pilot pressure by a pilot line 39, and the valve is closed when the pilot pressure is lower than 70 kgf/cm$^2$. That is, when the main pressure is over 70 kgf/cm$^2$, the pressurized oil is supplied to the cylinder 3 and oil is discharged from the cylinder 3.

Numeral 41 is a fail-safe valve which is provided in the passage 42 connecting the down-stream side of the accumulator 22a of the passage 10 and passage 36. The fail-safe valve 41 functions such that accumulated oil of the accumulators 22a and 22b is returned to the reservoir 29 by switching the fail-safe valve 41 to the open state at the failure and the high-pressured state is released. Furthermore, numeral 43 is an orifice provided in the pilot line 39 and functions so as to delay closing the check valve 38 when the fail-safe valve 41 is opened. Numeral 44 is a relief valve which returns oil to the passage 36 when the oil pressure of the hydraulic chamber 3c of each hydraulic cylinder $3_{FL}$, $3_{FR}$ is abnormally increased. Numeral 45 is a return accumulator connected to the passage 36 which accumulates the pressure when the oil is discharged from the hydraulic cylinder 3.

A flow control to each cylinder 3 by the controller 19 will be described based on FIGS. 4 through 6.

Figure 4:
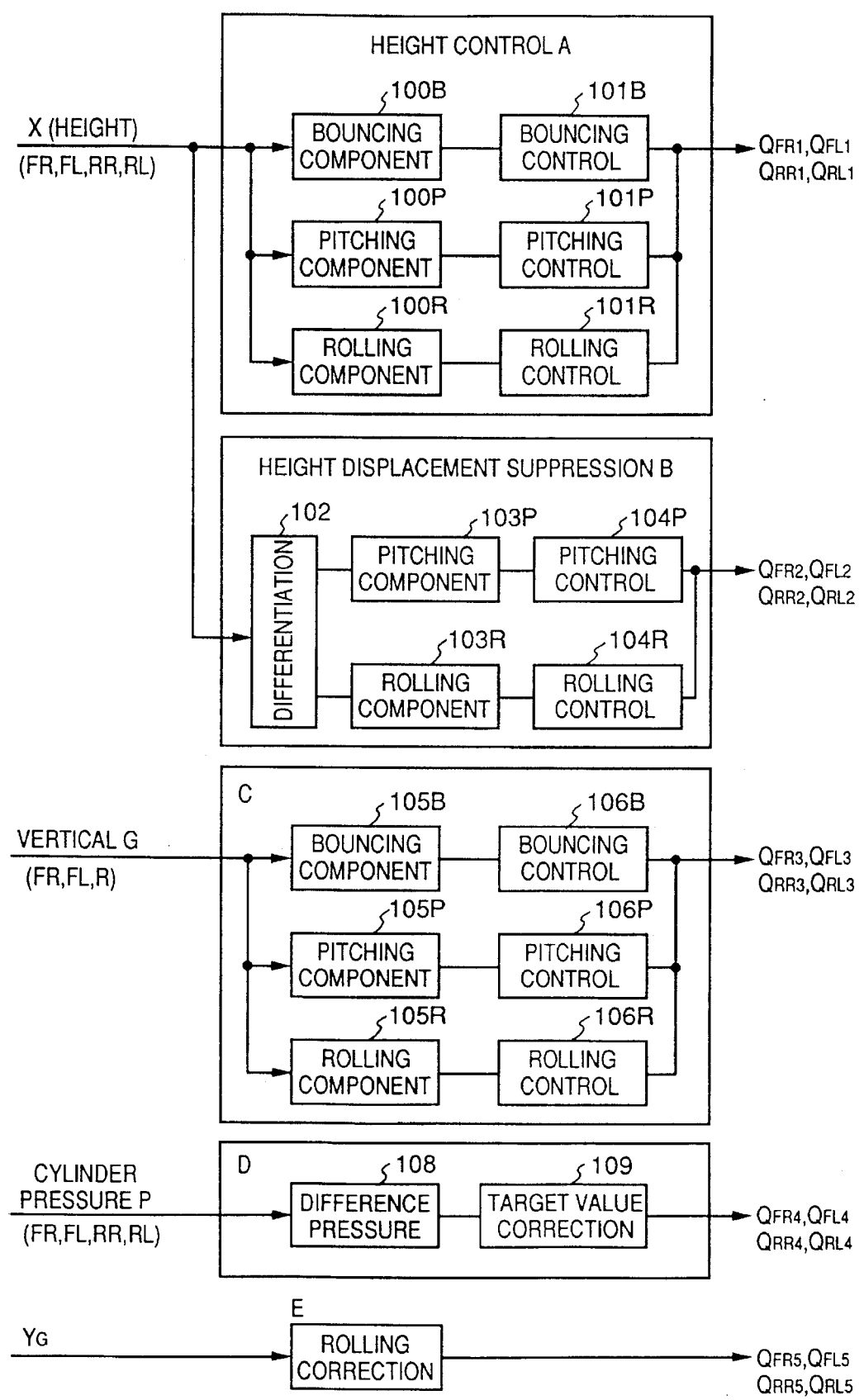
FIG. 4 is a block diagram illustrating a general construction of a control system function of the preferred embodiment.

FIG. 4 is a diagram for explaining the theory of generating a control signal Q to control the flow amount to each cylinder 3. As shown in FIG. 4, the flow control by the controller 19 comprising a vehicle-height control subsystem A, vehicle-height displacement suppression subsystem B, vertical acceleration suppression subsystem C, warp/twist suppression subsystem D, and rolling control correction subsystem E. These subsystems generate flow control signals $Q_1$, $Q_2$, $Q_3$, $Q_4$, $Q_5$ respectively. These signals are summed up at every wheel, and the sum is determined as control signals ($Q_{FR}$, $Q_{FL}$, $Q_{RR}$, $Q_{RL}$) for the wheels.

The control in each subsystem will be described in general with reference to FIG. 4.

In the vehicle-height control subsystem A, calculators $100_B$, $100_P$, $100_R$ calculate and generate a bouncing component, pitching component, and rolling component, respectively, of a vehicle displacement from four vehicle height signals Xs from the four height sensors 14 at the four wheels. Each of the calculators $101_B$, $101_P$, $101_R$ calculates a flow control signal on each component. The flow control signals calculated on the three components are summed up in each wheel, and outputted as $Q_{FR1}$, $Q_{FL1}$, $Q_{RR1}$, $Q_{RL1}$.

In the vehicle-height displacement suppression subsystem B, a differentiator 102 differentiates the four height signals, calculators $103_P$ and $103_R$ extract a pitching component, respectively, and rolling component from the differentiated signals, and calculators $104_P$ and $104_R$ calculate flow control signals on each of the pitching component and rolling component. The flow control signals on the calculated two components are summed up in each wheel, and outputted as $Q_{FR2}$, $Q_{FR2}$, $Q_{RR2}$, $Q_{RL2}$.

In the vertical acceleration suppression subsystem C, calculators $105_B$, $105_P$, $105_R$, calculate and generate a bouncing component, pitching component, and rolling component, respectively, from the acceleration signals $G_{FR}$, $G_{FL}$, $G_R$ from the three acceleration sensors 15 which are respectively mounted at the front-right wheel, front-left wheel, and a midpoint between the rear wheels. Calculators $106_B$, $106_P$, $106_R$, calculate flow control signals on each component. The flow control signals of the calculated three component are integrated in each wheel and outputted as $Q_{FR3}, Q_{FL3}, Q_{RR3}, Q_{RL3}$.

In the warp/twist suppression subsystem D, a calculator 108 calculates a twisted amount based on each pressure signals P in the four hydraulic cylinders, and a calculator 109 calculates twist suppression signals $Q_{FR4}, Q_{FL4}, Q_{RR4}, Q_{RL4}$ on each wheel.

In the rolling control correction subsystem E, a calculator 110 calculates and outputs control signals $Q_{FR5}, Q_{FL5}, Q_{RR5}, Q_{RL5}$ on each wheel based on the signals $Y_G$ from the lateral acceleration sensors 16.

Figure 5:
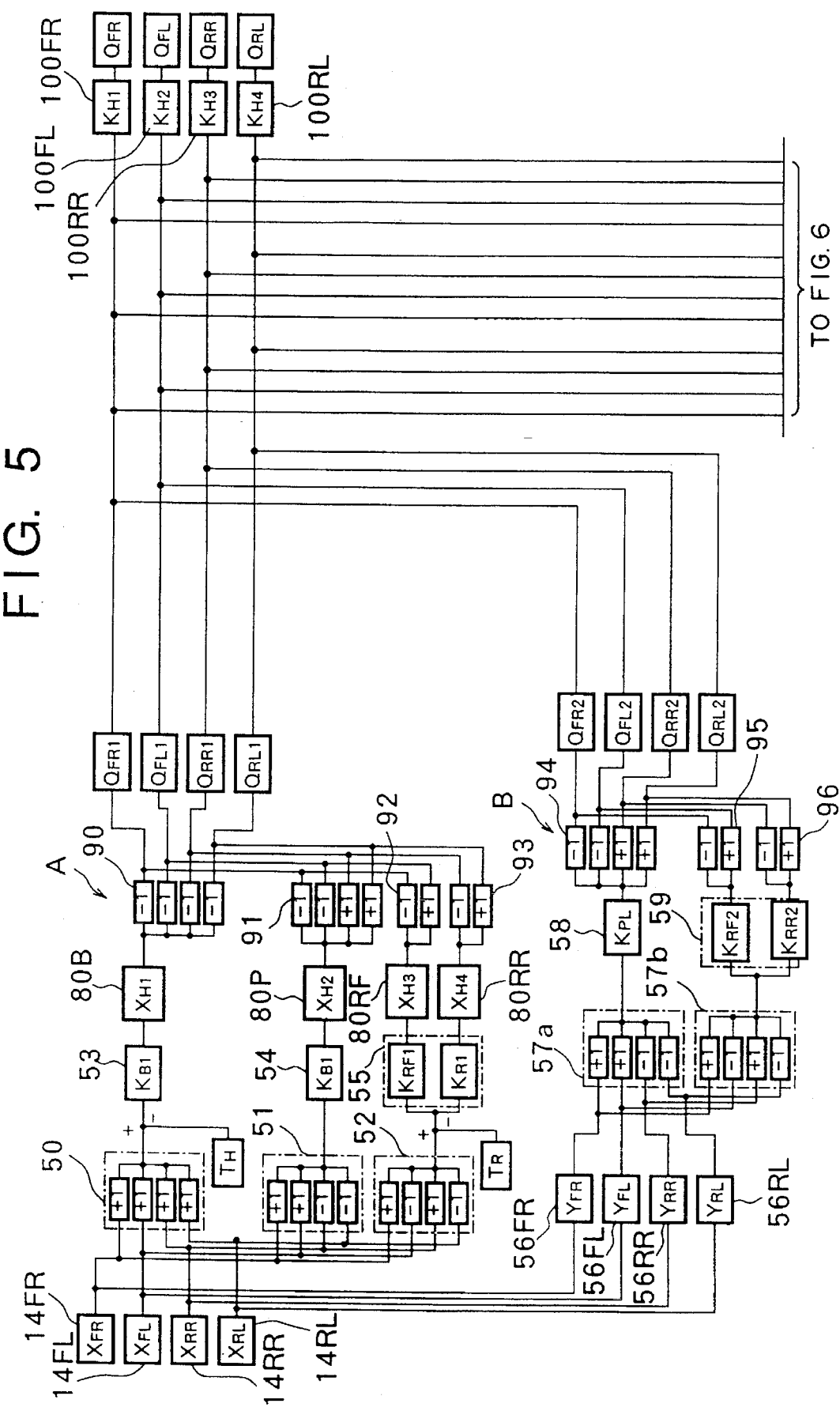
FIG. 5 is a diagram illustrating a detailed construction of the control system of the preferred embodiment.
Figure 6:
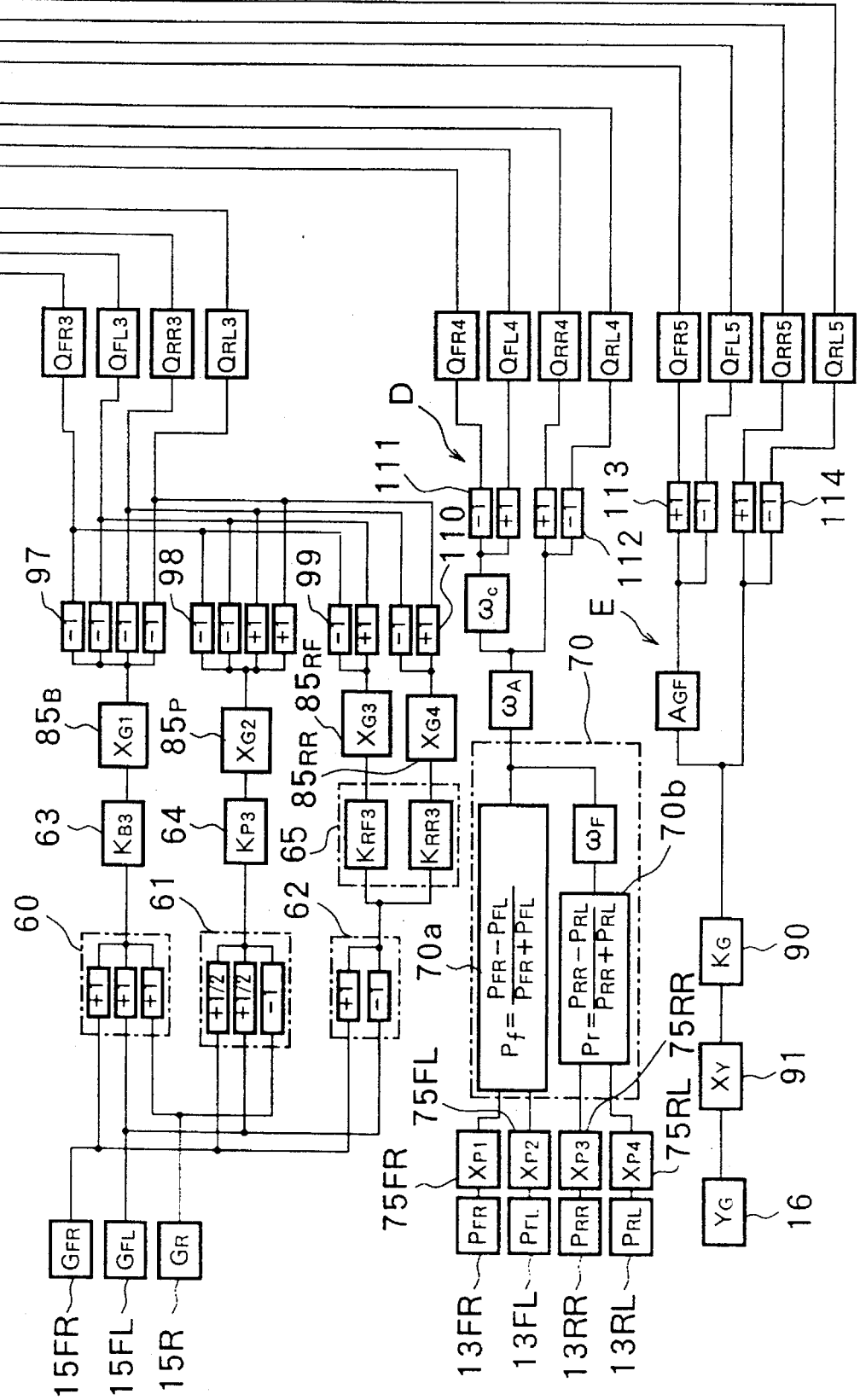
FIG. 6 is a diagram illustrating the detailed construction of the control system of the preferred embodiment.

The control by the controller 19 which is generally described along with FIG. 4 will be further described in detail based on FIGS. 5 and 6.

As described above, the control of the controller 19 comprises the vehicle-height control subsystem A, vehicle-height displacement suppression subsystem B, vertical acceleration suppression subsystem C, warp/twist suppression subsystem D, and rolling control correction subsystem E. The vehicle-height control subsystem A controls the vehicle height to be a target height based on the height signals $X_{FR}, X_{FL}, X_{RR}, X_{RL}$ of the height sensors $14_{FR}, 14_{FL}, 14_{RR}, 14_{RL}$, respectively. The vehicle-height displacement suppression subsystem B suppresses the vehicle-height displacement based on vehicle-height displacement acceleration signals $Y_{FR}, Y_{FL}, Y_{RR}, Y_{RL}$ obtained from the vehicle-height signals. The vertical acceleration suppression system C reduces vibration of the vehicle based on the vertical acceleration signals $G_{FR}, G_{FL}, G_{RR}, G_{RL}$ of the three cylinder pressure sensors $15_{FR}, 15_{FL}, 15_R$. The warp/twist suppression subsystem D calculates a twisted amount based on the pressure signals $P_{FR}, P_{FL}, P_{RR}, P_{RL}$ of the cylinder pressure sensors $13_{FR}, 13_{FL}, 13_{RR}, 13_{RL}$, respectively, of each wheel. The rolling control correction subsystem E corrects the rolling control based on the lateral acceleration signal $Y_G$ of the lateral acceleration sensor 16.

VEHICLE-HEIGHT CONTROL SUBSYSTEM A

In the control subsystem A, numeral 50 is a bouncing component calculator (corresponding to $100_B$ in FIG. 4). The bouncing component is obtained by summing up the outputs $X_{FR}$ and $X_{FL}$ of the right- and left-front wheels $2_F$ out of the height signals $X_{FR}, X_{FL}, X_{RR}, X_{RL}$ of the four height sensors $14_{FR}, 14_{FL}, 14_{RR}, 14_{RL}$. That is, the bouncing component calculator 50 calculates:

Bouncing Component=$X_{FR}+X_{FL}+X_{RR}+X_{RL}$

Numeral 51 is a pitching component calculator (corresponding to $100_P$ in FIG. 4). The pitching component is obtained by subtracting the outputs $X_{RR}$ and $X_{RL}$ of the right- and left-rear wheels $2_r$ from the sum of $X_{FR}$ and $X_{FL}$ of the right- and left-front wheels $2_F$. That is, the pitching component calculator 51 calculates:

Pitching Component=$(X_{FR}+X_{FL})-(X_{RR}+X_{RL})$

Numeral 52 is a rolling component calculator (corresponding to $100_R$ in FIG. 4). The rolling component is obtained by adding the difference between the outputs of the right- and left-front wheels $2_F(X_{FR} X_{FL})$ and the difference between the outputs of the right- and left-rear wheels $2_R(X_{RR}-X_{RL})$. That is, the rolling component calculator 52 calculates:

Rolling Component=$(X_{FR}-X_{FL})+(X_{RR}-X_{RL})$

Numeral 53 is a bouncing-amount calculator (corresponding to $101_B$ in FIG. 4) which inputs a bouncing component calculated by the bouncing component calculator 50 and the target height $T_H$, and calculates a control variable for the bouncing control of the flow control valve 9 based on the gain coefficient $K_{B1}$. Numeral 54 is a pitching-amount calculator (corresponding to $101_P$ in FIG. 4) which inputs a pitching component calculated by the pitching component calculator 51 and calculates a control variable for the pitching control based on the gain coefficient $K_{P1}$. Numeral 55 is a rolling-amount calculator (corresponding to $101_R$ in FIG. 4) which inputs a rolling component calculated by the rolling displacement component calculator 52 and target rolling displacement $T_R$, and calculates a control variable for the bouncing control based on the gain coefficients $K_{FR1}$, $K_{RR1}$ so as to correspond to the target rolling displacement $T_R$.

Each of the control variables calculated by the calculators 53, 54, 55 are inverted in their signs in every wheel (inverted so as to be opposite to the signs of the height displacement signal of the height sensor 14), a control variable of the bouncing, pitching, rolling are respectively added in the subsystem A, flow signal $Q_{FR1}, Q_{FL1}, Q_{RR1}, Q_{RL1}$ of flow control valve 9 are obtained.

More specifically, the calculators 90 output a control signal whose signs are all inverted from the control variables which have been calculated by the calculator 53. The control signal will serve to suppress bouncing at each wheel. Furthermore, an adder 91 outputs a control signal which controls a pitching movement between the front and rear wheels by adding the signals whose signs are opposite to the signs added in the calculator 51 to the signals calculated by the calculator 54 (that is, the opposite signs of the front wheels are given to the rear wheels). Adders 92, 93 generate control signals which suppress the rolling between the right and left wheels by adding the signals whose signs are opposite to the signs obtained by the calculator 52 to the control signals calculated by the calculator 55.

Low pass filters $80_B$ (for bouncing), $80_P$ (for pitching), $80_{RF}$ (for the front wheel rolling), and $80_{RR}$ (for the rear wheel rolling) are provided between the calculators 53, 54, 55 and the adders 90, 91, 92, 93, respectively. When a control signal calculated by the calculators 53, 54, 55 is larger than the predetermined cut-off frequencies $X_{H1}, X_{H2}$, $XH_3, X_{H4}$, these low pass filters cut off the control signal and output the signal whose frequency is less than $X_{H1}$~$X_{H4}$.

Figure 7:
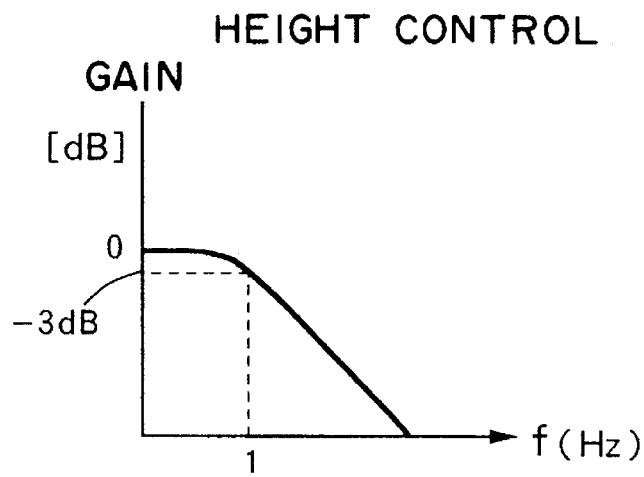
FIG. 7 is a graph illustrating the characteristic of filters $80_B$, $80_P$ used for the height control in accordance with the preferred embodiment.
Figure 8:
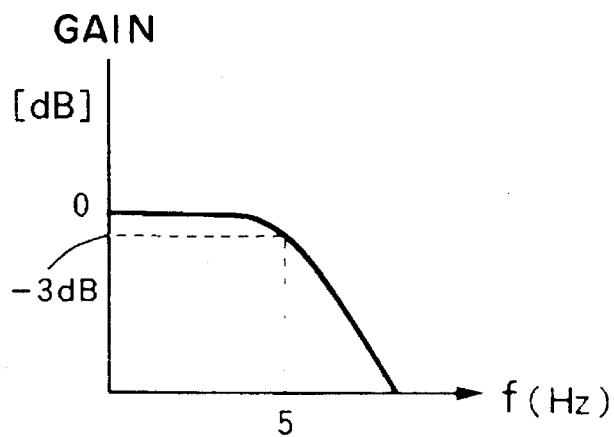
FIG. 8 is a graph illustrating the characteristic of filters $80_{RF}$, $80_{RR}$ used for the height control in accordance with the preferred embodiment.

FIG. 7 is a graph illustrating the frequency characteristic (cut-off frequencies $X_{H1}, X_{H2}$=1 Hz) of the filters $80_B$ for bouncing and $80_P$ for pitching. FIG. 8 is a graph illustrating the frequency characteristic (cut-off frequencies $X_{H3}, X_{H4}$=5 Hz) of the filters $80_{RF}$ and $80_{RR}$ for rolling.

VEHICLE-HEIGHT DISPLACEMENT SUPPRESSION SYSTEM B

The detail of the subsystem B will be described with reference to FIG. 5. In the subsystem B, the height signals $X_{FR}, X_{FL}, X_{RR}, X_{RL}$ from the height sensors $14_{FR}$–$14_{RL}$ are inputted into differentiators $56_{FR}, 56_{FL}, 56_{RR}, 56_{RL}$ and differentiated components of the height signals $X_{FR}, X_{FL}, X_{RR}, X_{RL}$ from each $56_{FR}$–$56_{RL}$, that is, the height displacement acceleration signal $Y_{FR}, Y_{FL}, Y_{RR}, Y_{RL}$ can be obtained. Furthermore, the height displacement acceleration signal Y is obtained from:

$Y=(X_n-X_{n-1})/T$ $X_n$: Vehicle-height displacement at the time t
$X_{n-1}$: Vehicle-height displacement at the time t−1
T: Sampling duration Numeral 57a of FIG. 5 is a pitching component calculator (corresponding to 103P in FIG. 4) which calculates a pitching component by subtracting the sum of the outputs $Y_{RR}$, $Y_{RL}$ of the height displacement acceleration of the rear wheels $2_R$ from the sum of the height-displacement acceleration of the front wheels $2_F$. That is, the pitching component calculator 57a calculates:

Pitching component of the vehicle displacement $=(Y_{FR}+Y_{FL})-(Y_{RR}+Y_{RL})$ Numeral 57b is a rolling component calculator (corresponding to $103_R$ in FIG. 4) which calculates the difference $Y_{FR}-Y_{FL}$ of the height displacement acceleration of the front wheels and the difference $Y_{RR}-Y_{RL}$ of the height displacement acceleration of the rear wheels. That is, the rolling component calculator 57b calculates:

Rolling component of vehicle displacement $=(Y_{FR}-Y_{FL})+(-Y_{RR}Y_{RL})$

Furthermore, numeral 58 is a pitching-amount calculator (corresponding to $104_P$ in FIG. 4) which inputs a pitching component calculated by the pitching component calculator 57a and calculates a control variable of each flow control valve 9 of the pitching control based on the gain coefficient $K_{P2}$. Numeral 59 is a rolling-amount calculator (corresponding to $104_R$) which inputs a rolling component calculated by the rolling component calculator 57b and calculates a control variable of each flow control valve 9 of the rolling control based on the gain coefficients $K_{FR2}$, $K_{RR2}$.

Each of the control variables respectively calculated by controllers 58 and 59 is inverted in each wheel (inverted so as to be opposite in sign of the height displacement acceleration signal of the differentiators $56_{FR}-56_{RL}$) and each of the pitching control amount and rolling control amount is added. Thus, the flow control signals $Q_{FR2}$, $Q_{FL2}$, $Q_{RR2}$, $Q_{RL2}$ of the flow control valve 9 are obtained.

VERTICAL ACCELERATION SUPPRESSION SYSTEM C

In the subsystem C of FIG. 6, numeral 60 is a bouncing component calculator (corresponding to $105_B$ in FIG. 4) which sums up outputs $G_{FR}$, $G_{EL}$, $G_R$ of the three vertical acceleration sensors $15_{FR}$, $15_{FL}$, $15_R$ and calculates:

Bouncing component of vertical $G=G_{FR}+G_{FL}+G_R$.

Numeral 61 is a pitching component calculator (corresponding to $105_P$ in FIG. 5) which subtracts the output $G_R$ of the rear wheel $2_R$ from the sum of a half of the output $G_{FR}$ and half of the output $G_{FL}$ of the front wheels, and calculates:

Pitching component of vertical G $=½ (G_{FR}+G_{FL})-G_R$.

Numeral 62 is a rolling component calculator (corresponding to $105_R$ in FIG. 4) which subtracts the output $G_{FL}$ of the left-front wheel from the output $G_{FR}$ of the right-front wheel, and calculates:

Rolling component of vertical $G=G_{FR}-G_{FL}$.

Furthermore, numeral 63 is a bouncing amount calculator (corresponding to $106_B$ in FIG. 4) which inputs the bouncing component calculated by the calculator 60 and calculates a control variable with respect to the flow control valve 9 of each wheel for the bouncing control based on the gain coefficient $K_{B3}$. Numeral 64 is a pitching amount calculator (corresponding to $106_P$ in FIG. 4) which inputs the pitching component which is calculated by the pitching component calculator 61 and calculates a control variable with respect to the flow control valve 9 in the pitching control based on the gain coefficient $K_{P3}$. Numeral 65 is a rolling component calculator (corresponding to $106_R$ in FIG. 4) which inputs the rolling component which is calculated by the rolling component calculator 62 and calculates a control variable in the rolling control based on the gain coefficients $K_{FR3}$, $K_{RR3}$.

Each control variable which is calculated in the calculators 63, 64, 65, so as to suppress the vertical displacement of the vehicle by the bouncing component, pitching component, and rolling component, is inverted at each wheel. Each control variable of the bouncing, pitching, rolling component is added with respect to each wheel, and the flow control signals $Q_{FR3}$, $Q_{FL3}$, $Q_{RR3}$, $Q_{RL3}$ are obtained in the subsystem C.

Low pass filters $85_B$ (for bouncing), $85_P$ (for pitching), $85_{RF}$ (for the front-wheel rolling) are provided between the calculators 63, 64, 65 and adders 97, 98, 99, 111. When the control signals calculated by the calculators 63, 64, 65 are larger than the predetermined number of cut-off frequencies $X_{G1}$, $X_{G2}$, $X_{G3}$, $X_{G4}$, the control signals are cut off and only the signals whose cut-off frequencies are below $X_{G1} \sim X_{G4}$ outputted.

Figure 9:
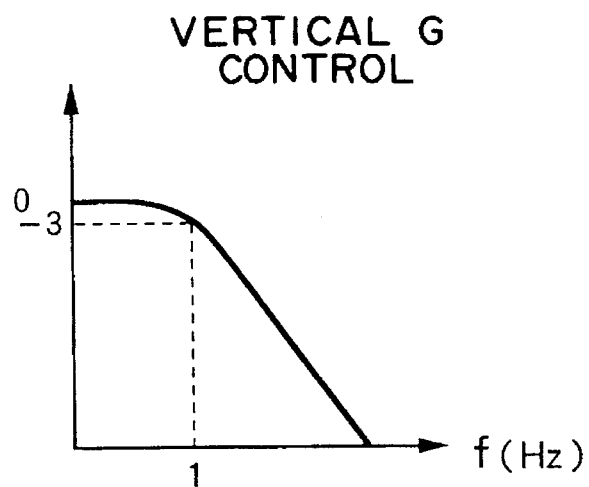
FIG. 9 is a graph illustrating the characteristic of filters $85_B$, $85_p$ used for the vertical G control in accordance with the preferred embodiment.
Figure 10:
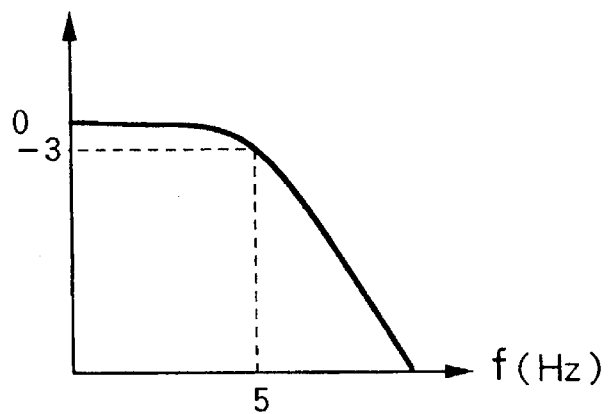
FIG. 10 is a graph illustrating the characteristic of filters $85_{RF}$, $85_{RR}$ used for the vertical G control in accordance with the preferred embodiment.

FIG. 9 is a graph illustrating the frequency characteristic (cut-off frequencies $X_{G1}$, $X_{G2}$=1 Hz) of the filters $85_B$ for bouncing and $85_P$ for pitching. FIG. 10 is a graph illustrating the frequency characteristic (cut-off frequencies $X_{G3}$, $X_{G4}$=5 Hz) of the filters $85_{RF}$ and $85_{RR}$ for rolling.

WARP/TWIST SUPPRESSION SUBSYSTEM D

In the subsystem D (FIG. 6), a calculator 70a inputs the hydraulic pressure signals $P_{FR}$, $P_{FL}$ from the two cylinder pressure sensors $13_{FR}$, $13_{EL}$ of the front wheels, and calculates a ratio $P_f$ of the pressure difference $(P_{FR}P_{FL})$ between the right and left wheel to the added pressure differences $(P_{FR}+P_{FL})$ of the front wheels by:

$P_f=(P_{FR}-P_{FL})/(P_{FR}+P_{FL})$.

A hydraulic pressure ratio calculator 70b calculates a hydraulic pressure ratio $P_r$ of the rear-wheel side by:

$P_r=(P_{RR}-P_{RL})/(P_{RR}+P_{RL})$.

These calculators 70a and 70b correspond to the warp/twist controller 108 of FIG. 4. In the subsystem D, after the pressure difference ratio $P_r$ of the rear-wheel side is multiplied by a predetermined value, the gain coefficient $\omega_F$, the product is subtracted from the pressure ratio $P_f$ of the front-wheel side. The result is multiplied by the gain coefficient $\omega_A$. The multiplied result is further multiplied by the gain coefficient $\omega_C$ for only front side wheels. Subsequently, the obtained values are inverted to equalize the control value to each wheel between the right and left wheels. Accordingly, the flow control signals $Q_{FR4}$, $Q_{FL4}$, $Q_{RR4}$, $Q_{RL4}$ of the flow control valve 9 are obtained.

Low pass filters $75_{FR}$, $75_{FL}$, $75_{RL}$, $75_{RL}$ are provided between the cylinder pressure sensors $13_{FR}-13_{RL}$ and the calculators 70a, 70b, respectively. When the pressure signals $P_{FR}$, $P_{FL}$, $P_{RL}$, $P_{RL}$ from the cylinder pressure sensors $13_{FR}$–$13_{RL}$ have higher frequencies than the predetermined cut-off frequencies $X_{P1}$, $X_{P2}$, $X_{P3}$, $X_{P4}$ these low pass filters cut off the pressure signals $P_{FR}$ –$P_{RL}$ and pass only the signals $P_{FR}$–$P_{RL}$ whose frequencies are less than $X_{P1}$–$X_{P4}$.

ROLLING CONTROL CORRECTION SUBSYSTEM E

In the subsystem E (FIG. 6), numeral 90 is a calculator which inputs the lateral acceleration signal $Y_G$ of the lateral acceleration sensor 16 and calculates the control amount to suppress the lateral acceleration of the vehicle based on the gain coefficient $K_G$. As for the control amount calculated by the calculator 90, after the front-wheel control amount is modified with the coefficient $A_{GF}$, the signs are inverted in the right and left wheels so that the ratio at the front wheel differs from that at the rear wheel. Accordingly, flow control signals $Q_{FR5}$, $Q_{FL5}$, $Q_{RR5}$, $Q_{RL5}$ of the flow control valve 9 are obtained.

A low pass filter 91 is provided between the lateral acceleration sensor 16 and the calculator 90. When the lateral acceleration signal $Y_G$ from the lateral acceleration sensor 16 has higher frequency than the predetermined cut-off frequency $X_Y$, the lateral acceleration signal $Y_G$ is cut off and only the signal whose cut-off frequency is below $Y_G$ is passed.

Accordingly, the vehicle-height displacement components $Q_{FR1}$, $Q_{FL1}$, $Q_{RR1}$, $Q_{RL1}$ of the flow control signals determined in each flow control valve 9, the vehicle-height displacement acceleration components $Q_{FR2}$, $Q_{FL2}$, $Q_{RR2}$, $Q_{RL2}$, the vertical acceleration components $Q_{FR3}$, $Q_{FL3}$, $Q_{RR3}$, $Q_{RL3}$, the pressure components $Q_{FR4}$, $Q_{FL4}$, $Q_{RR4}$, $Q_{RL4}$, and the lateral acceleration components $Q_{FR5}$, $Q_{FL5}$, $Q_{RR5}$, $Q_{RL5}$ are finally added respectively. In correctors $100_{FR}$, $100_{FL}$, $100_{RR}$, $100_{RL}$, the added values are respectively multiplied by each of correction values $K_{H1}$, $K_{H2}$, $K_{H3}$, $K_{H4}$, and the total flow control signals $Q_{FR}$, $Q_{FL}$, $Q_{RR}$, $Q_{RL}$ are obtained.

The above-mentioned features I–II of the present embodiment are described below.

Figure 11:
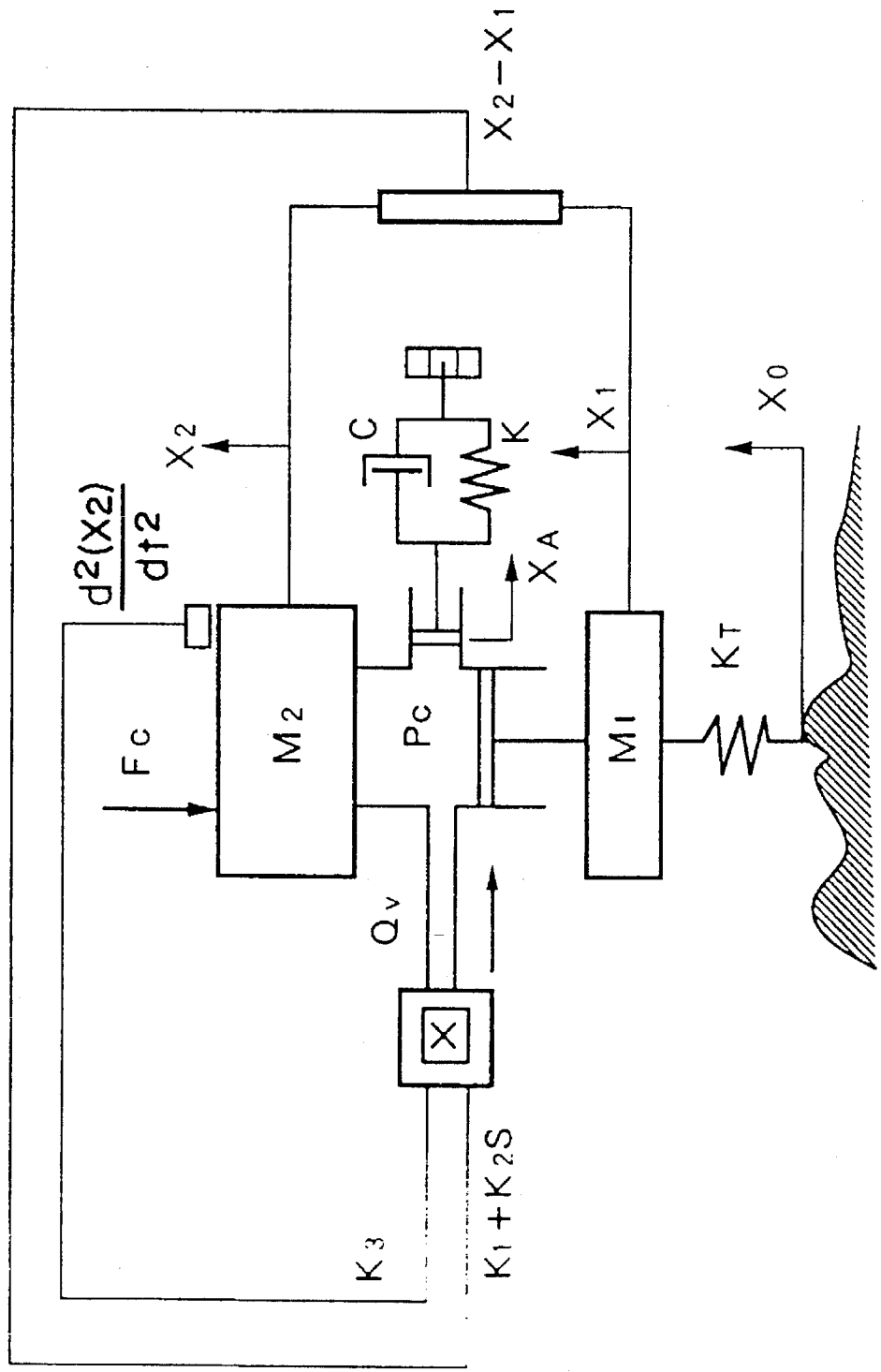
FIG. 11 is a diagram illustrating a model of the suspension control in accordance with the preferred embodiment.
Figure 12:
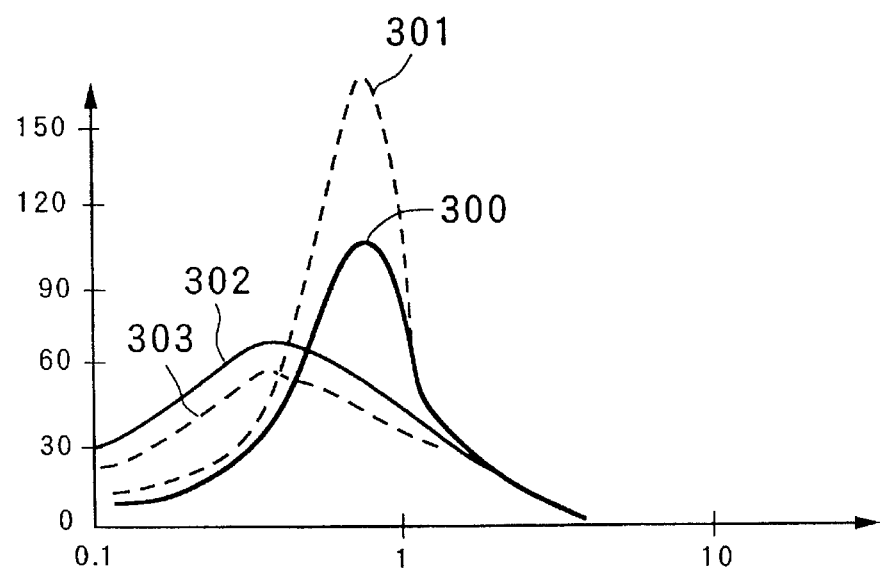
FIG. 12 is a graph illustrating the characteristic of the result of sprung weight displacement obtained from the model of FIG. 11.
Figure 13:
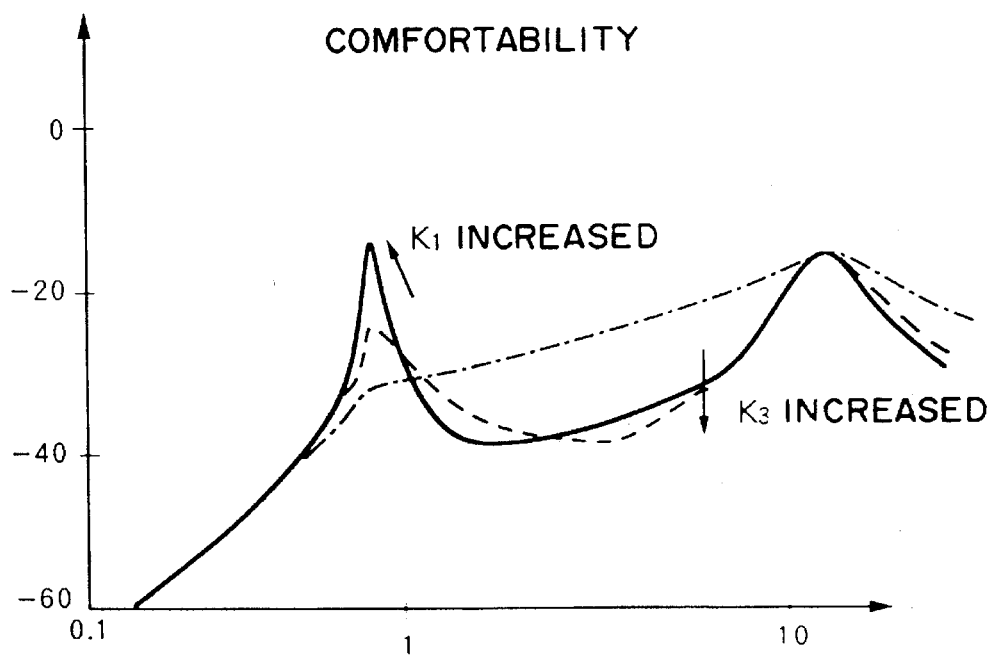
FIG. 13 is a graph illustrating the characteristic of the result of comfortability obtained from the model of FIG. 11.

FIG. 11 is a vibration model on one of the wheels of FIG. 2. In FIG. 11, "Pc" denotes a hydraulic cylinder and corresponds to the cylinder 3 of FIG. 2. On the right side of the cylinder Pc, gas springs C and K are provided and correspond to the gas springs 5 of FIG. 2. The flow amount to the cylinder Pc is defined by a signal Qv. Consider the cylinder Pc as a "spring", "$M_1$" of FIG. 11 indicates an "unsprung weight" of the wheel, while "$M_2$" indicates a "sprung weight" of the vehicle body. When a ground position is indicated by $X_0$, the position of the unsprung weight (wheel) is $X_1$, and the sprung weight (vehicle body) is $X_2$, $(X_2-X_1)$ indicates an output from the height sensor 14 and a second-order differentiation of $X_2$, $d^2(X_2)/dt^2$ indicates as an output of the vertical G sensor 15. In the model of FIG. 11, the flow amount Qv to the cylinder Pc is determined in a manner such that $(X_2 -X_1)$ is fed back with the gain $(K_1+K_2s)$ (where "s" is a differentiation operator) and $d^2(X_2)$ at $^2$ is fed back with the gain $K_3$.

FIGS. 12–15 show the characteristics of displacement of the sprung weight ($X_2$), comfortability ($X_2$–$X_1$), ground contact ability ($X_1$), flow amount (Qv) frequency.

Figure 14:
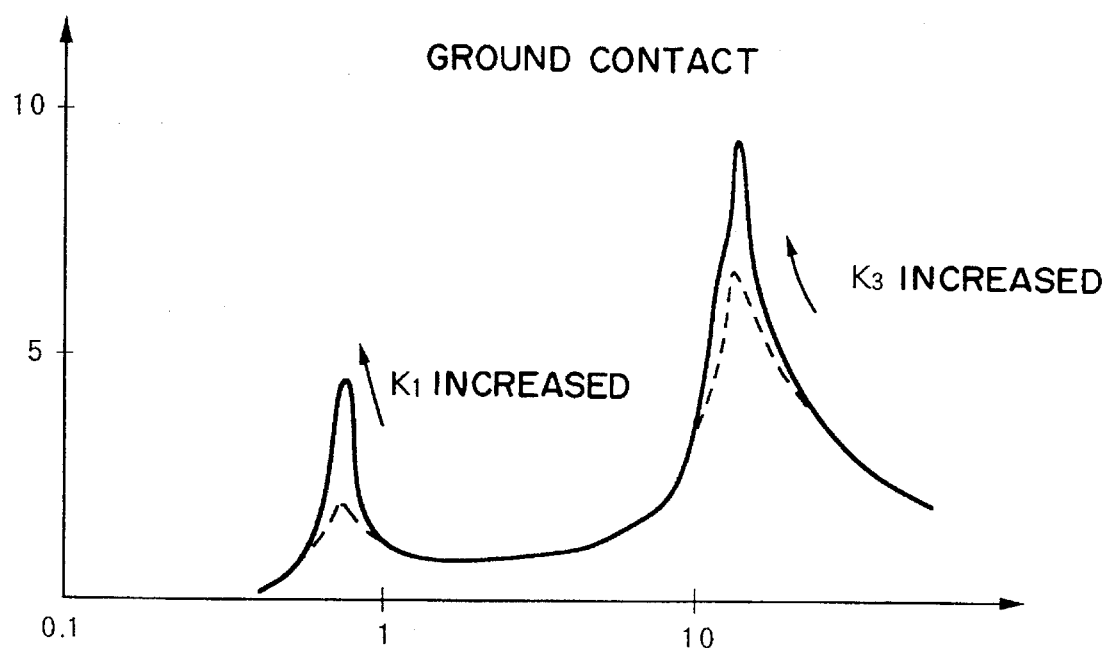
FIG. 14 is a graph illustrating the characteristic of the result of ground contactability obtained from the model of FIG. 11.
Figure 15:
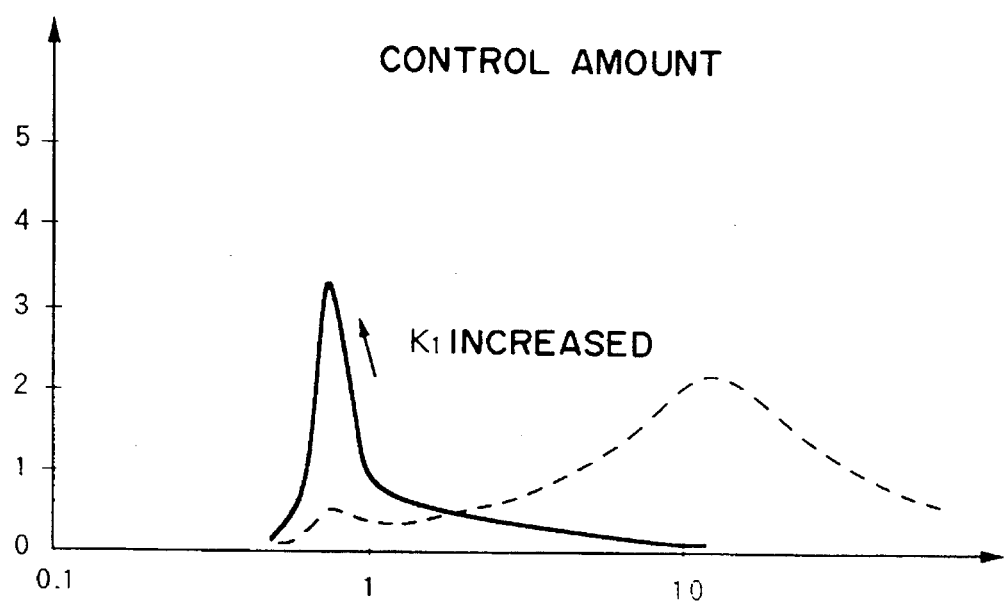
FIG. 15 is a graph illustrating the characteristic of flow amount obtained from the model of FIG. 11.
Figure 16:
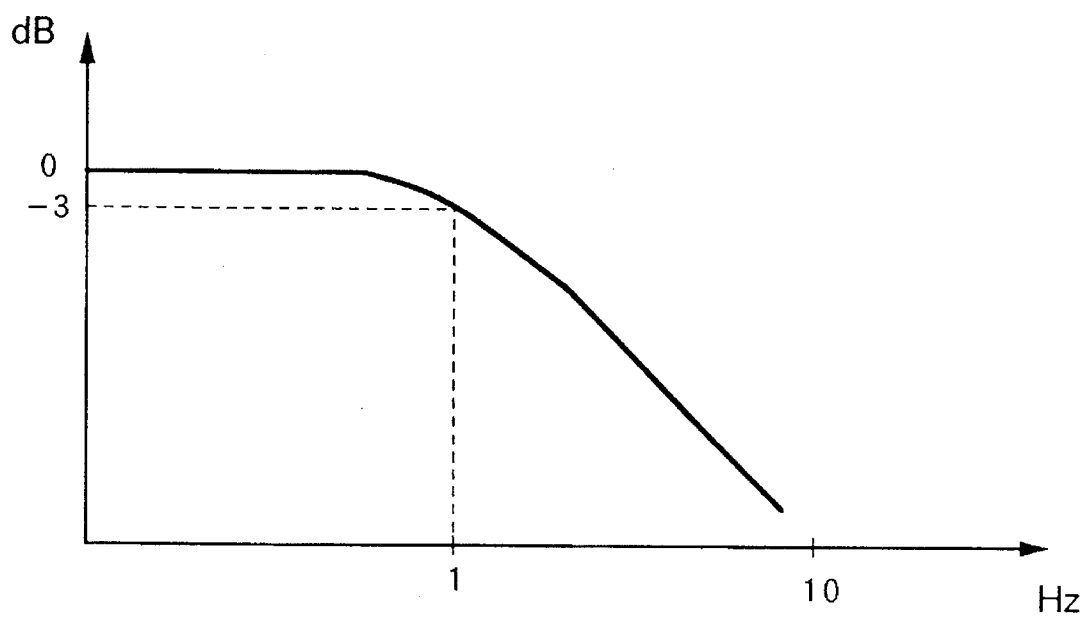
FIG. 16 is a graph illustrating a general characteristic of the filter used for the height control system and vertical G control system in accordance with the preferred embodiment.

If the gains $K_1$, $K_2$, $K_3$ are made greater, a feedback is applied so that the height displacement and acceleration variation is suppressed. The characteristic shown in the figures is such that resonance occurs around 1 Hz and 10 Hz. It indicates that the problem will not be solved by simply changing the gain. According to the graph (FIG. 12) illustrating the characteristic of the displacement of the sprung weight ($X_2$) of FIG. 12, if the gain $K_1$ is increased (the characteristic 301), the resonance around 1 Hz is greater than the case where the gains $K_1$, $K_3$ are set as normal (the characteristic 300). If only $K_3$ is increased or both of $K_1$ and $K_3$ are increased, the resonance around 1 Hz is reduced. According to the ground contactability characteristic shown in FIG. 14, if the gain $K_1$ is increased the resonance occurs around 1 Hz, while if the gain $K_3$ is increased the resonance around 10 Hz occurs. Accordingly, even if the gains $K_1$ and $K_3$ are made greater in order to improve the responsiveness of the suppression control of the sprung weight displacement by bouncing or rolling movement, as shown in FIG. 14, a deterioration of the ground contact ability (deterioration of the controllability and stability) around 4–10 Hz occurs contrarily. However, the comfortability around 1 Hz is decreased by increasing $K_1$, while that around 10 Hz is improved. That is, the gain $K_3$ effects the ground contactability (controllability and stability) and the comfortability around 10 Hz, in the opposite way with each other. If a filter having a cut-off frequency of an extremely low frequency such as 1–4 Hz, as shown in FIG. 16, is used for the filters $80_B$, $80_P$, $80_{RF}$, $80_{RR}$ of FIG. 5 and the filters $85_B$, $85_P$, $85_{RF}$, $85_{RR}$ of FIG. 6, the deterioration of the ground contactability and comfortability around 4–10 Hz is suppressed. In other words, maintaining the cut-off frequency of the filter as being low gives a weaker responsiveness of the active suspension and better comfortability.

All the bouncing movement, pitching movement, rolling movement do not always equally contribute to a driver's comfortability and the controllability and stability of the vehicle. More particularly, the rolling movement causes inclination of the vehicle body to the right or left, a ground contactability weight becomes unbalanced between the right and left wheels, resulting in the effect in the controllability and stability. Accordingly, as to the rolling movement, the controllability and stability will be improved, when the responsiveness (preventing a transitional rolling movement) to the rolling displacement is raised by relatively increasing the gain for rolling movement in comparison with the bouncing movement or pitching movement, rather than weakening the rolling suppression effect by decreasing the gain. In the embodiment, as shown in FIGS. 7 and 8 (or FIGS. 9 and 10), the cut-off frequency (5 Hz) of the filter $80_B$ (or $85_B$) for rolling movement suppression is set so as being higher than the cut-off frequency (1 Hz) of the filters ($80_P$, $80_{RF}$, $80_{RR}$, $85_P$, $85_{RF}$, $85_{RR}$) for bouncing or pitching movement suppression.

More particularly, in a vehicle which is set with the cut-off frequencies of the filters set in the above-described manner, the controls of the bouncing, pitching, and rolling movements are effective in the similar manner for a vehicle movement (the height displacement or vertical G displacement) around 1 Hz. However, for a vehicle movement or displacement around 2 Hz 5 Hz, the bouncing control and pitching control are not effective, however, the rolling control is effective. In this way, since the rolling control becomes better responsive to the bouncing control and pitching control, the transitional rolling displacement is prevented.

Accordingly, when cut-off frequencies of filters used for the controls of bouncing component, pitching component, and rolling component in the vehicle-height control subsystem and vehicle-height displacement suppression subsystem are set so as being lower than 1–5 Hz, a deterioration of ground contactability and comfortability occurring around 10 Hz is prevented. Furthermore, each of the cut-off frequencies of the filters can be independently determined, and generation of the transitional rolling displacement can be prevented by setting the cut-off frequency of the rolling component higher than that of the bouncing 5 component (or pitching component).

MODIFICATION

As many widely different embodiments of the present invention can be made without departing from the spirit and scope of the present invention.

Figure 17:
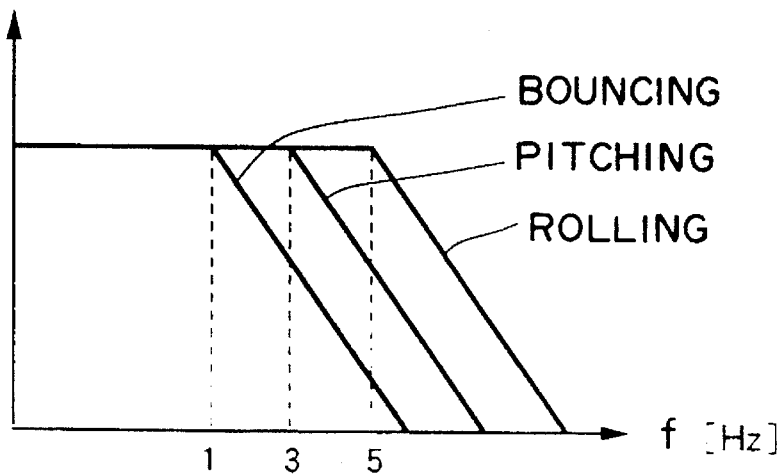
FIG. 17 is a graph illustrating a characteristic of a modified filter used for the height control system and vertical G control system in accordance with the preferred embodiment.

M-1: In the preferred embodiment, the cut-off frequency of the bouncing component and that of the pitching component are both set as 1 Hz. However, the values can be different from each other. In this regard, since the effect of the pitching displacement to the comfortability is greater than that of the bouncing displacement, but smaller than that of the rolling displacement, as shown in FIG. 17, the cut-off frequencies $X_{H1}$ ($X_{G1}$), $X_{H2}$ ($X_{G2}$), $X_{H3}$ ($X_{G3}$), $X_{H4}$($X_{G4}$) of the filters $80_B$ ($85_B$), $80_P$ ($85_P$), $80_R$ ($85_R$) can be determined as 1 Hz, 3 Hz, 5 Hz, respectively.

Figure 18:
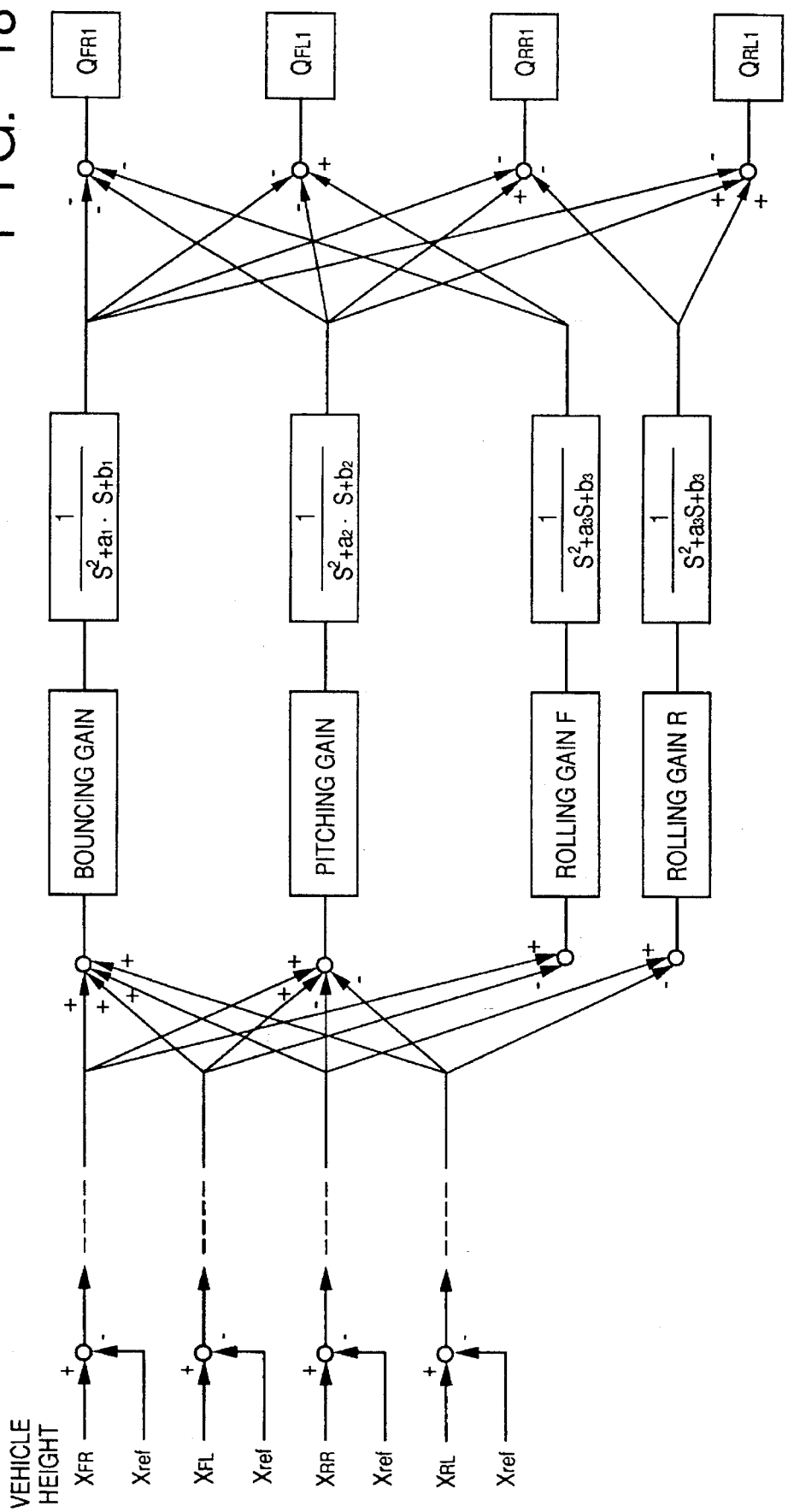
FIG. 18 is a diagram illustrating a modified construction of the filter used for the height control system and vertical G control system in accordance with a modification of the preferred embodiment.

M-2: In the preferred embodiment, the filters $80_B$ ($85_B$), $80_P$ ($85_P$), $80_R$ ($85_R$) are primary responsive filters, however, secondary responsive filters can be used. In this case, since the filter relative to the rolling gain has a larger frequency range in comparison with those of the pitching and bouncing gains, the filter relative to the rolling movement is not needed. FIG. 18 is a diagram illustrating an example where the secondary filters are used for the bouncing and pitching components without the filter for the rolling component in the vehicle-height control system A. In this modification, $X_{ref}$ denotes reference height signal.

M-3: In the preferred embodiment, the filters $80_B$ ($85_B$), $80_P$ ($85_P$), $80_R$ ($85_R$) are respectively provided between the gain 53 (63) and the adder 90 (97), the gain 54 (64) and the adder 91 (98), and the gain 55 (65) and the adder 92, 93 (99, 100). However, these filters can be provided in the prior stage of the adder 50, 51, 52 (60, 61, 62).

As many apparently widely different embodiments of the present invention can be made without departing from the spirit and scope thereof, it is to be understood that the invention is not limited to the specific embodiments thereof except as defined in the appended claims.

What is claimed is:

1. A suspension apparatus for a vehicle capable of changing a characteristic of suspension by controlling a resistance force generated by hydraulic cylinders which are respectively provided between a vehicle body and each wheel of the vehicle, comprising:

a plurality of vehicle-height sensors detecting vehicle height signals at a plurality of positions;

extraction means for extracting a bouncing component signal and a rolling component signal from the vehicle-height signals detected by the plurality of vehicle-height sensors;

low pass filtering means for passing a low frequency component each of the bouncing component signal and the rolling component signal; and control means for controlling a resistance force of each hydraulic cylinder against a relative displacement of the vehicle body with respect to the wheel based on output signals from said low-pass filtering means, wherein a cut-off frequency for the low frequency component of the rolling component signal set in the low-pass filtering means is set higher than a cut-off frequency for the low frequency component the bouncing component signal.

2. The suspension apparatus according to claim 1, wherein said extraction means further extracts a pitching component signal from the signals detected by the plurality of vehicle-height sensors and outputs the pitching component signal to said low-pass filtering means, and wherein a cut-off frequency for the rolling component signal set in said low-pass filtering means is set higher than a cut-off frequency set for the pitching component signal.

3. The suspension apparatus according to claim 2, wherein a cut-off frequency for the pitching component signal set in said filtering means is set lower than a cut-off frequency for the rolling component signal and higher than a cut-off frequency for the bouncing component signal.

4. The suspension apparatus according to claim 1, further comprising:

a plurality of acceleration sensors detecting vertical acceleration signals at a plurality of positions and outputting the vertical acceleration signals to said extraction means, wherein said extraction means further extracts a bouncing component signal and a rolling component signal from the detected acceleration signal and outputs to said filtering means, and wherein said low-pass filtering means further filters each of the detected bouncing component signal and rolling component signal of the acceleration signal, and a cut-off frequency for the rolling component signal of the acceleration signal set in said low-pass filtering means is set higher than a cut-off frequency for the bouncing component signal of the acceleration signal.

5. The suspension apparatus according to claim 4, wherein said extraction means further extracts a pitching component signal from the acceleration signal detected by the plurality of acceleration sensors, and outputs the pitching component signal to said filtering means, and wherein a cut-off frequency for the rolling component signal is set higher than a cut-off frequency for the pitching component signal of the acceleration signal in said filtering means.

6. The suspension apparatus according to claim 5, wherein a cut-off frequency for the pitching component signal of the acceleration signal is set lower than a cut-off frequency for the rolling component signal of the acceleration signal, and higher than a cut-off frequency for the bouncing component signal of the acceleration signal, in said filtering means.

7. A suspension apparatus for a vehicle capable of changing a characteristic of suspension by controlling a resistance force generated by hydraulic cylinders which are respectively provided between a vehicle body and each wheel of the vehicle, comprising:

a plurality of vehicle-height sensors detecting vehicle height signals at a plurality of positions;

extraction means for extracting a bouncing component signal and a rolling component signal from the vehicle-height signals detected by the plurality of vehicle-height sensors;

low-pass filtering means for passing a low frequency component of each of the bouncing component signal and the rolling component signal; and control means for controlling a resistance force of each hydraulic cylinder against a relative displacement of the vehicle body with respect to the wheel based on output signals from said low-pass filtering means, wherein a cut-off frequency for the low frequency component of the rolling component signal set in the low-pass filtering means is set to substantially 5 Hz, and a cut-off frequency for the bouncing component signal to substantially 1 Hz.

8. The suspension apparatus according to claim 2, wherein the cut-off frequency of the pitching component signal is set to substantially 1 Hz, and the cut-off frequency of the rolling component signal is set to substantially 5 Hz.

9. A suspension apparatus for a vehicle capable of changing a characteristic of suspension by controlling resistance force generated by hydraulic cylinders which are respectively provided between a vehicle body and each wheel, comprising:

- a plurality of vehicle-height sensors detecting vehicle height signals at a plurality of positions;
- extraction means for extracting a bouncing component signal, a pitching component signal and a rolling component signal from the vehicle-height signals detected by the plurality of vehicle-height sensors; and
- calculation means for calculating a control signal which controls a resistance force of each hydraulic cylinder against a relative displacement of the vehicle body with respect to the wheel, said control signal being calculated based on the generated bouncing, pitching and rolling component signals and control gains for the respective component signals,
- wherein said calculation means sets a control gain for the rolling component signal relatively higher than a control gain for the bouncing component signal and relatively higher than a control gain for the pitching component signal in a frequency range of the generated bouncing, pitching and rolling component signals which is substantially within 1 Hz to 5 Hz.

10. A suspension apparatus for a vehicle capable of changing a characteristic of suspension by controlling a resistance force generated by hydraulic cylinders which are respectively provided between a vehicle body and each wheel, comprises:

- a plurality of vehicle-height sensors detecting vehicle height signals at a plurality of positions;
- extraction means for extracting a bouncing component signal and a rolling component signal from the vehicle-height signals detected by the plurality of vehicle-height sensors; and
- calculation means for calculating a control signal which controls a resistance force of each hydraulic cylinder against a relative displacement of the vehicle body with respect to the wheel, said control signal being calculated based on the generated bouncing and rolling component signals and control gains for the respective component signals,
- wherein said calculation means sets a control gain for the rolling component signal relatively higher than a control gain for the bouncing component signal in an intermediate frequency range of the generated bouncing and rolling component signals, and wherein said intermediate frequency range is substantially within 1 Hz to 5 Hz.

* * * * *